9009X
C. Angerine,
Churn.
Patented Aug. 17. 1835
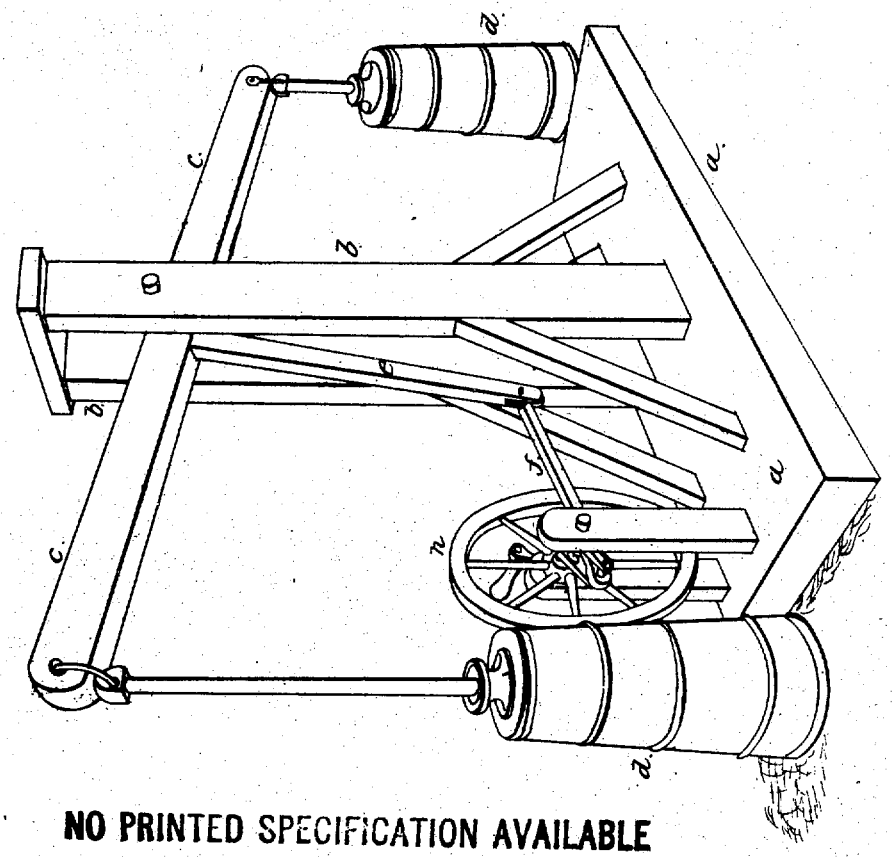
NO PRINTED SPECIFICATION AVAILABLE Caleb Angerine — New York City
Letters Patent, Dated August 17th 1835

The Schedule referred to in these Letters Patent and making part of the same containing a description in the words of the said Caleb Angerine himself of his Improvement in the construction of a Churning machine

---

To All to whom These Presents Shall Come:

Be it known that I Caleb Angerine of the City, County and State of New York have invented a new and useful improvement in the Construction of Machinery for operating the ordinary dairy Churn in the process of making Butter And that the following is a full & exact description of the construction and operation of said machine as invented or improved by me. The constituent parts of the above mentioned machine are the following viz A platform, gallows frame walking beam, pendulous lever- pitman- driving crank- Fly wheel and hand Crank. The platform may be made of plank or timbers about six feet long by two wide, centrally upon which rises the gallows frame formed of two posts, four braces and cross top piece, about one foot below which is suspended the walking beam about _ feet long with the gudgeons of its horizontal axis entering the side posts of the gallows frame, Under each end of the walking beam is placed a churn to the dashers of which the ends of said beam is connected by a cord or other free acting joint. The pendulous lever is mortised to and hangs centrally under the axis of the walking beam about four feet long, to the bottom of which is connected by an active tongue joint the horizontal pitman, the other end of which is attached to and operated by the operating crank. which is fixed upon a horizontal shaft on which is suspended a fly wheel of about eighteen inches in diameter proportioned in weight

9009X to the power required. The Fly wheel is suported on two short posts
at one corner of the platform and stands paralel with the same
nearly opposite of one of the Churns. The proportional lengths
and dimentions of the walking beam, pendulous lever, pit-
man and operating crank, should be graduated to produce
such length of stroke with the dashers as may be best
adapted to the strength of the operator or other motive power.
The mode of operation is effected by giving motion to the
fly-wheel by means of the Hand Crank, which conveys
through the medium of the operating crank, pitman and
pendulous lever, a reciprocating motion to the walking beam,
and produces an alternate undulating motion to the Churn-
dashes, which are suspended at its opposite ends, as before
described. What I particularly claim in my invention or
improvement in the above specified Churn Machine is the
application of the walking beam — Fly wheel - Pendulous Lever,
operating Crank & Pitman in giving motion to one or more churns
at once in the manner above set forth. New York March 23 1835.

Witnesses
Walter Hunt
F. S. Lane

Caleb Angerine

— Recd. & Recorded April 29. 1842. — (528 words)

Exd. NGC